H. S. DICKINSON.
TRACTOR CONNECTION FOR HARVESTING MACHINES.
APPLICATION FILED SEPT. 20, 1916.
1,302,325.
Patented Apr. 29, 1919.
2 SHEETS—SHEET 1.
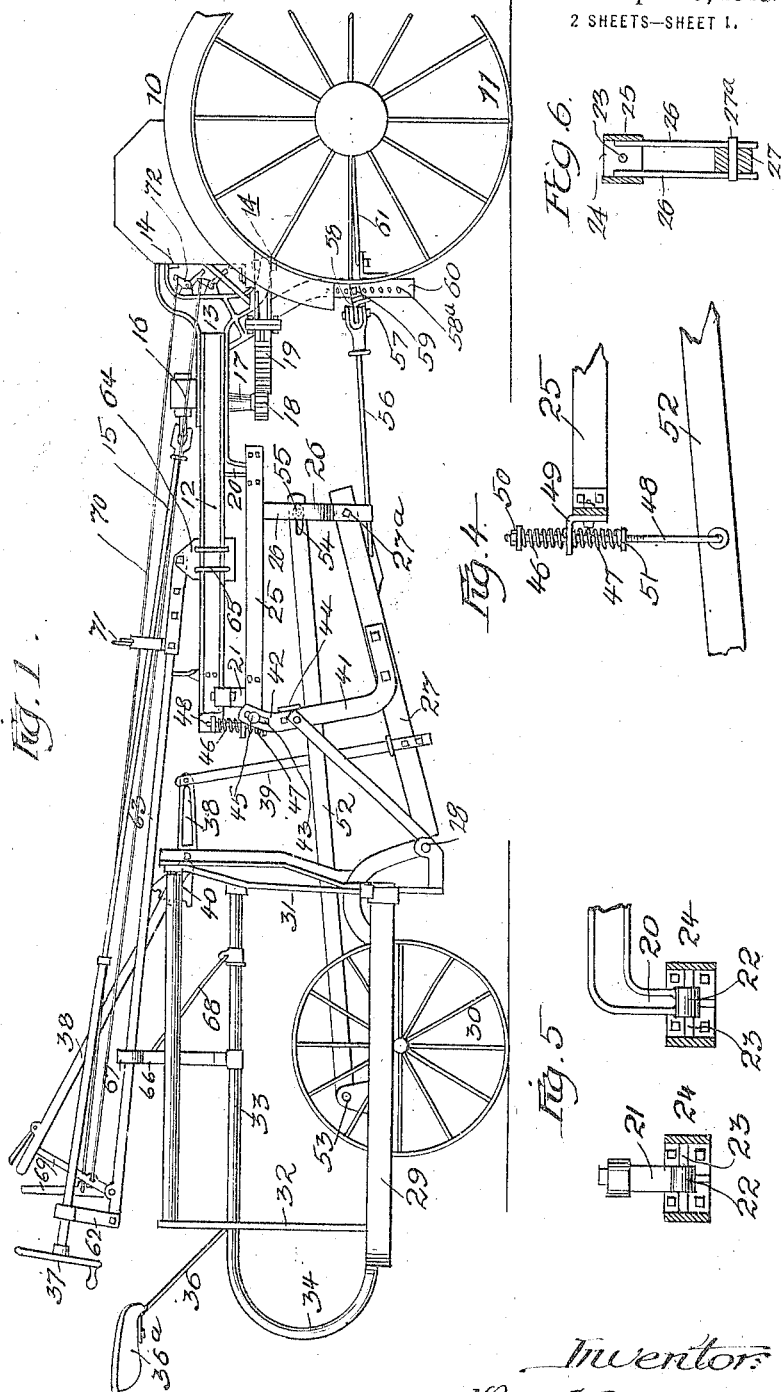

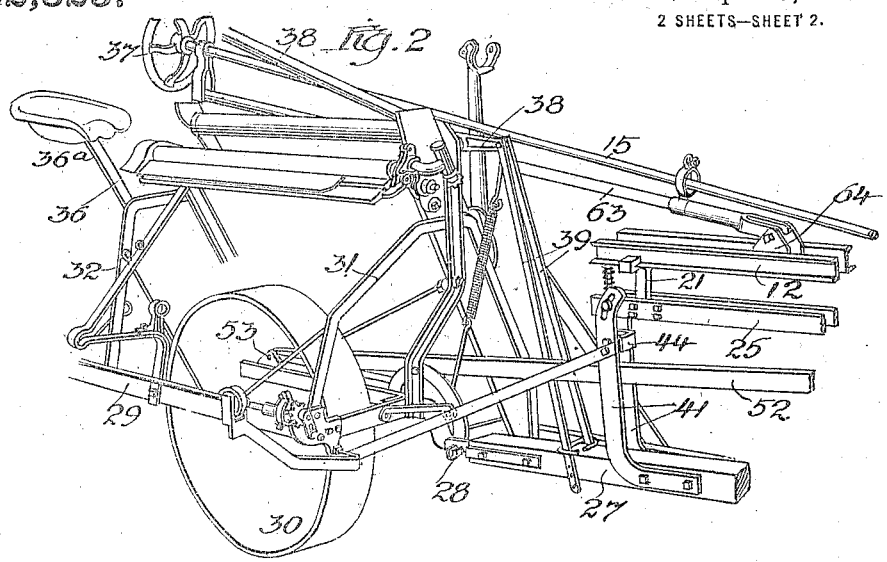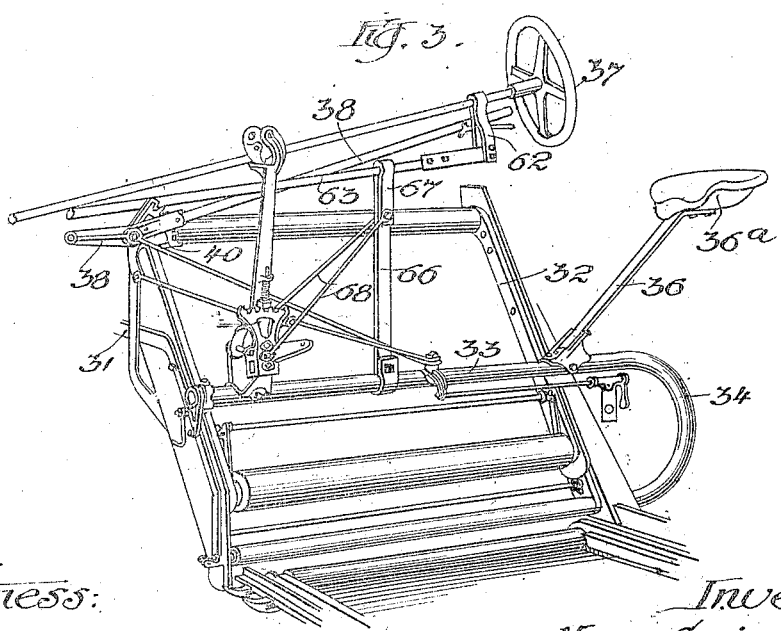

UNITED STATES PATENT OFFICE.

HARRY S. DICKINSON, OF MOLINE, ILLINOIS, ASSIGNOR TO MOLINE PLOW COMPANY, OF MOLINE, ILLINOIS, A CORPORATION OF ILLINOIS.

TRACTOR CONNECTION FOR HARVESTING-MACHINES.

1,302,325. Specification of Letters Patent. Patented Apr. 29, 1919.

Application filed September 20, 1916. Serial No. 121,190.

*To all whom it may concern:*

Be it known that I, HARRY S. DICKINSON, a citizen of the United States, residing at Moline, county of Rock Island, and State of Illinois, have invented certain new and useful Improvements in Tractor Connections for Harvesting-Machines, of which the following is a specification.

This invention relates to certain connections adapted to be interposed between a tractor and a harvesting machine for the purpose of coördinating the power unit and the trailing unit into a practically unitary implement without in any way impairing or destroying the capacity of each of the implements to subserve its intended functions.

The power unit which is employed in this invention, is of a type which derives the support for its rear end, from the ground wheels of the trailing implement, as distinguished from tractors of the self-contained type which are fully capable of being supported and steered independently of the trailer.

The tractor of the self-contained type, however, is ordinarily merely hitched or connected to the trailing implement, so that it becomes difficult, and in some cases impossible, to satisfactorily manipulate the implements in the field. This is particularly the case where it becomes necessary to reverse the implements or to turn them about on a short radius, in which cases the deficiencies of an ordinary connection become the more pronounced.

It is particularly desirable in the case of a self-binding harvester to provide adequate connections for uniting the power unit and the trailing implement into a substantially integral structure, in view of the peculiar difficulties experienced in the operation of harvesting machines by reason of the excessive draft to which the grain side of the machine is subjected by the contact of the cutter bar with the standing grain.

In a machine of this type, the center of draft is necessarily non-coincident with the center of resistance in view of the necessity for applying the draft, whether horses or a tractor, at a point sufficiently removed toward the stubble side of the harvester to avoid the possibility of trampling or crushing down the standing grain. The connections of the present invention are designed to meet these recognized requirements and at the same time are arranged so as to permit the frame of the harvester to be tilted forwardly or rearwardly to provide for the vertical adjustment necessary to accommodate the falling grain without imparting these variations to the power unit, which at all times is designed to maintain its horizontal position. This is important in view of the fact that any substantial variation from a horizontal level will tend to disturb the oil and water levels in the engine and thereby interfere with its efficient operation.

The invention, furthermore, relates to the means which are provided for maintaining the control of the power unit from the driver's seat on the harvester, so that it will be possible for a single operator to control both implements, and the invention, furthermore, relates to the means provided for affording the rigidity of connection required to coördinate the implements into a unitary structure and at the same time provide sufficient flexibility to permit the implements to individually conform to ground conditions, which is essential in order to avoid a racking or wrenching of the connections, as well as for other obvious reasons.

The invention, furthermore, is designed to afford a very close connection between the power unit and the binder which facilitates manœuvering and renders the structure more compact and serviceable.

In the drawings:

Figure 1 is a side elevation showing the power unit connected to a self-binding harvester of standard type, the latter being skeletonized to only display those portions which pertain to the present invention;

Fig. 2 is a perspective view showing the forward portions of a self-binding harvester, partially skeletonized, and with the connections of the present invention applied thereto;

Fig. 3 is a perspective view, looking toward the rear of a self-binding harvester from the grain side and showing the portions of the present invention applied thereto;

Fig. 4 is a detail of the spring connection between the power unit and the stub tongue of the harvester;

Fig. 5 is a detail of the connections between the rearwardly extending beam and the connecting element; and Fig. 6 a detail showing the hanger connection for the stub tongue.

The connections constituting the present invention are employed in conjunction with the power unit 10, having ground wheels 11, which power unit carries companion rearwardly extending beams 12, the forward ends of which are bolted or otherwise secured to a vertically standing yoke 13, the upper and lower arms of which are connected by means of vertical pivots 14 to the power unit in such a manner as to permit of a longitudinal swinging movement, but to prevent relative vertical movement.

The beams 12 serve in part as a mounting for a steering rod 15 which is within easy reach from the seat of the driver, located to the rear of the harvester, as will be presently explained.

The steering rod 15 operates through a suitable gearing 16 which imparts rotation to a shaft 17 carrying a pinion 18, which latter pinion meshes with a rack 19, the curvature of which is concentric with the axis of movement of the beams 12, so that by rotating the steering wheel, the beams may be swung to right or left to effect the steering of the combined implement.

The beams 12 are provided with forward and rear hangers 20 and 21, respectively, the lower ends of which are provided with sleeves 22 which are journaled upon longitudinally extending pivots 23 carried by brackets 24 which lie intermediate a pair of longitudinally extending bars 25 which constitute a connecting element in the form of an elongated frame which is adapted to tilt or rock upon the horizontal pivot bolts 23, which latter are of sufficient length to afford a slight endwise sliding movement between the parts, which is necessary to accommodate the connection to certain adjustments presently to be described.

Depending from the bars of the elongated frame, near the forward end thereof, are a pair of hanger bars 26 which are offset laterally toward the stubble side of the machine to a slight degree, and these hanger bars are spaced at their lower ends to receive the forward end of a stub tongue 27, which is pivoted at this point by a pivot 27ª, and which is connected at its rear end by means of a transverse horizontal pivot 28 to the forward end of the rectangular harvester frame 29. The point of connection is that commonly employed for connecting the stub tongue to a harvesting machine, which point is in advance of the bull wheel 30 and slightly in toward the grain side of the machine, as compared with the position of the bull wheel.

It will be understood that the harvester shown is of the ordinary or standard type and that the connections which constitute the novel features of the present invention are simply applied or superadded to a harvester of the standard type without any material change in its general structure or mode of operation. For this reason, it is deemed necessary to refer in detail only to those portions of the harvester which are in some measure concerned with the details of the present invention, and for this reason no reference will be made to such features of the harvester as the gathering reel, conveyer mechanism, binder mechanism, power connections, etc., although reference will be made to the framework of the machine which carries and supports the connections constituting the novel features of the present invention.

The rectangular frame 29 surrounds the bull wheel and this frame serves as a mounting for an upstanding forward A frame 31 and a similar rear frame 32, which carry the conveyer and binding mechanisms not shown. The inner legs of the forward and rear A frames serve as a support for an intermediate supporting rod or bar 33, the rear end 34 of which loops down and finds a point of connection to the rear portion of the harvester frame 29. This intermediate bar 33 serves as a support for the seat bar 36 which carries the seat 36ª which is located within easy reach of the steering wheel 37. This enables the driver to steer the power unit from a point at the rear of the harvester, and at the same time to exercise control over all the levers and appliances required in controlling both the power unit and the grain binding mechanism.

In order to better accommodate the failing grain, it is customary in self-binding harvesters of the type shown, to tilt the frame of the machine either forwardly or rearwardly upon the alined axis afforded by the bull wheel and the grain wheel, which tilting adjustment facilitates the gathering of the grain upon the elevator rolls preparatory to delivery to the binding mechanism. With this end in view, the harvester is balanced or poised as nearly as it is possible upon these centers, so that but slight power will be required to effect the desired adjustment.

In the case of the present invention, these forward and backward tilting movements of the harvester frame are effected by the operation of a hand lever 38 which is pivoted to a suitable standard upstanding from the forward A frame, and the forward end of the lever 38 is connected by means of a pair of link bars 39 with the stub tongue 27 at a point slightly in advance of the pivotal point 28. A suitable latch and segment mechanism 40 serves to hold the lever in its adjusted position and the rear end of the lever is located within easy reach of the driver's seat, so that by moving the lever up or down, the angularity between the harvester frame and the stub tongue may be varied, to the end that the main frame will be tilted up or down to the desired degree.

Some of the essential features of the present invention pertain to the provision which has been made for permitting these tilting movements of the harvester frame without imparting these movements to the rearwardly extending beams 12 and to the power unit. These features of the invention will now be described.

The stub tongue 27, at a point near its center, has upstanding therefrom a pair of parallel guide bars 41 which are slightly curved at their upper ends 42 and are provided with a pair of guide slots 43, the center of curvature of which is concentric with the pivot pin 27ª.

The guide bars 41 are connected near their upper ends by means of a spacer bracket 44, and above the spacer bracket, the guide bars are secured to the elongated connecting frame by means of guide pins 45 entered through the slots 43, which arrangement affords the guide bars a limited up and down movement to accommodate the adjustments heretofore described.

Springs 46 and 47 are mounted on a hanger rod 48 at points above and below a bracket 49 rearwardly extending from the bars 25, as shown in Fig. 4. The upper and lower faces of the bracket afford bearing points for the respective springs, the tension of which may be regulated by means of adjusting nuts 50 and 51, respectively, as best shown in Fig. 4. The bracket 49 projects rearwardly from the elongated connecting frame afforded by the bars 25, and this arrangement affords a limited up and down cushioned movement of a walking beam 52, the rear end of which is pivoted to an ear 53 on the inner rail of the main frame 29 of the harvester, the forward end of the walking beam being provided with a slot 54 which receives a pin 55 entered through the hangers 26.

The draft from the power unit is transmitted to a draft rod 56, the rear end of which is secured to the stub tongue and the forward end of which is pivoted by means of a vertical pivot 57 to a clevis bar 58 which in turn is pivoted by a horizontal pivot 59 to any pair of a series of holes 58ª near the lower end of a pair of depending draft bars 60, the upper ends of which are slightly angled to the rear and connected to the casting which affords the vertically pivoted yoke 13, the point of connection for the draft rod being substantially in vertical alinement with the pivotal center of movement of the yoke and its associated parts. The draft bars 60 are connected by means of a forward draft bar 61 with a suitable point of connection on the power unit.

The rear end of the steering rod 15 is supported and journaled within a loop bracket 62 upstanding from the rear end of an extension supporting rod 63, the forward end of which is pivoted between ears 64 which are secured by means of clamps 65 to the rearwardly extending beams 12. The extension supporting rod is slidably supported at its rear end by means of a standard 66 which is mounted upon the intermediate rod or bar 33 of the harvester frame, the extension supporting rod being entered through a loop or collar 67 on the standard, which is braced by means of brace rods 68 descending down diagonally to the intermediate frame rod 33, as shown in perspective in Fig. 3.

The extension supporting rod 63, furthermore, serves as a means of support for a series of controlling levers 69 located within easy reach from the driver's seat, which controlling levers are connected by means of rods 70 which extend forward through a guide loop 71 on the extension supporting rod, their forward ends being connected with a series of bell crank levers 72, located at or near the axial center of the yoke 13 which carries the beams 12. The bell cranks are in turn connected with suitable controlling devices carried by the power unit for controlling the clutch, brake and other working portions of the engine. The specific construction of these connections is not material to an understanding of the present invention and further description is deemed unnecessary.

In operation, it will be seen that the driver from his position on the seat at the rear of the harvester, will be enabled not only to control the adjustment of the harvester, but will also be enabled to control the operation of the engine and to steer the combined mechanism, which, for steering purposes, is to be considered as a unitary implement having four points of ground support afforded in front by the two tractor wheels 11 and at the rear by the bull wheel and grain wheel of the harvester, with an articulating joint afforded by the vertical pivots of the yoke 13 and by the clevis and connections for the draft rod 56.

This method of connecting the parts together serves to given to the implement, as a whole, the character of a unitary structure which is capable of being steered either while advancing or reversing, and which is capable of action within a much smaller radius than is possible where a harvester is connected and trailed behind a tractor of the self-contained type. While the machine is advancing, practically all the draft is imparted through the low down draft rod 56, but in cases where it is necessary to reverse the machine, the draft will be transmitted mainly through the hangers 20 and 21 which connect the rearwardly extending beams 12 with the elongated frame which is pivoted to tilt on a horizontal axis, but is incapable of independent vertical movement.

Where it is desired to upwardly tilt the frame, the rear end of the lever 38 will be depressed and thereafter locked in adjusted position, which movement serves to raise the rear end of the stub tongue 27 which pivots on the horizontal pivot 27$^a$. This movement causes uptilting of the forward end of the harvester frame, the joint afforded by the rear horizontal pivot 28 being broken in an upward direction.

During this movement the harvester frame will tilt upon the axis afforded by the bull wheel and the grain wheel and the uptilting of the forward end of the frame will, of course, occasion a commensurate downtilting of the rear end of the frame, which will result in a slight lowering of the walking beam 52, the rear end of which, it will be noted, is pivoted to the harvester frame at a point behind its axis of tilting movement. This slight lowering of the rear end of the walking beam will result in a proportionately decreased lowering of the rod 48, which, with its spring connections, unites the walking beam with the rear end of the horizontally pivoted elongated supporting frame.

It will thus be seen that as the forward end of the harvester frame is raised or lowered in the adjustment of the cutter bar, the walking beam will be correspondingly lowered or raised to a commensurate degree, but the movements thus imparted through the spring connections to the horizontal beams carried by the power unit are so slight as to practically be negligible, with the result that the power unit will be maintained at substantially its correct horizontal level at all times, thereby obviating the objections which would attend an up and down tilting of the rear end of the power unit.

As the rear end of the stub tongue is raised or lowered in the adjustment of the harvester frame, the guide bars 41 will be correspondingly raised or lowered, but these movements are accommodated by means of the slotted connection between the guide bars and the elongated connecting frame, so that the guide bars will serve their function of affording a rear connection with the elongated connecting frame without in any way interfering with the necessary vertical adjustments of the stub tongue.

In like manner, the slotted connection at the forward end of the walking beam affords the necessary freedom of movement for permitting these elements to conform to the required adjustments.

When the implement is traveling over rough ground, it is desirable to provide sufficient flexibility in the connections to permit the front and rear portions of the combined implement to independently adapt themselves to ground conditions, but this flexibility is afforded by means of the spring connection between the walking beam and the elongated supporting frame. Thus, if the harvester encounters an elevation in the ground, the entire rear mechanism, including the harvester and the stub tongue, is permitted to rock upwardly on the pivot 27$^a$ at the forward end of the stub tongue, which movement will tend to elevate the rear end of the walking beam and thereby serve to compress the lower spring 47 on the vertical connecting rod 48, which spring thus serves as a buffer to absorb the shock occasioned by the rise of the trailing harvester without transmitting this upward movement in any appreciable degree to the rear end of the elongated frame and the parts supported from the power unit.

The slot connection for the forward end of the walking beam serves to freely accommodate movements of this kind, whether in an upward or downward direction, thereby relieving the implement from excessive shock or strain, which would be occasioned if the parts were rigidly, rather than flexibly connected. Under normal conditions, however, the springs will be maintained in a substantial state of equilibrium and afford the necessary support to maintain the parts in their intended position of adjustment, and if the parts are of sufficient strength the springs may be omitted.

It will thus be seen that the walking beam serves to flexibly support the forward end of the harvester against vertical displacement, and that its construction and mode of connection with the harvester frame is such that it will accommodate itself to the necessary tilting adjustments of the harvester frame without imparting any appreciable vertical movement to the rear end of the connections carried by the power unit. At the same time, the walking beam is entirely relieved of draft functions, since the draft is imparted directly through the draft rod 56 to the forward end of the stub tongue, but it serves to distribute vertical thrusts to the mounting points 53 and 53.

The connection between the tractor and the binder is much "closer coupled" than would be the case even with a horse hitch. This will be appreciated when it is understood that the hitch point for the horses would for a binder be normally thirty inches ahead of the stub tongue, which would bring it nearly on the pivotal center for the guiding element of the tractor, thus shortening the unit very materially compared with a horse hitch, and in making these conditions no function of either the binder or of the tractor has been disturbed. At the same time the tractor receives its guiding influence and necessary elements of support from the binder. The binder is drawn in such a manner by the tractor as to meet every requirement for turning or backing when the tractor is reversed.

Although the invention has been described particularly with reference to the structure and arrangement of a self-binding harvester, it will be understood that the invention is equally applicable to other harvesting implements or to other implements, the frame structures of which are comparable to that heretofore described.

I claim:

1. The combination with an unstable tractor device and a trailing implement, said trailing implement having a tilting frame adapted to tilt about a horizontal axis, of draft transmitting means connecting the tractor with the tilting frame and secured to the latter at a point in advance of its horizontal axis, means for varying the angularity of the tilting frame, and compensating connections secured at the rear end to the trailing implement at a point behind its horizontal axis, and secured at the front end to the rear portion of the tractor device and moving vertically in opposition to the movements of the draft transmitting means to permit adjustments of the tilting frame with respect to the rear portion of the tractor device while maintaining the latter in substantially normal balance, substantially as described.

2. The combination with an unstable tractor device and a trailing implement, said trailing implement having a tilting frame adapted to tilt about a horizontal axis, of draft transmitting means vertically pivoted at the forward end to the tractor and horizontally pivoted at the rear end to the tilting frame at a point in advance of its horizontal axis, means for varying the angularity of the tilting frame, and compensating connections secured at the rear end to the trailing implement at a point behind its horizontal axis, and secured at the front end to the rear portion of the tractor device and moving vertically in opposition to the movements of the draft transmitting means to permit adjustments of the tilting frame with respect to the rear portion of the tractor device while maintaining the latter in substantially normal balance, substantially as described.

3. In a combined implement of the class described, the combination of an unstable power unit affording a forward point of ground support, a trailing implement affording a rear point of ground support and provided with a tilting frame pivoted on a horizontal axis, a stub tongue horizontally pivotally connected to the trailing implement, means for adjusting the angle between the stub tongue and the tilting frame, and a compensating connection pivoted at its rear end to the tilting frame at a point behind the horizontal axis thereof, and making connection at its front end with the power unit, and moving vertically in opposition to the movements of the stub tongue during tilting adjustments to permit adjustment of the tilting frame with respect to the rear portion of the power unit while maintaining the latter in substantially normal balance, substantially as described.

4. In a combined implement of the class described, the combination of an unstable power unit affording a forward point of ground support, a beam rearwardly extending therefrom and pivoted thereto on a vertical pivot, a connecting element connected with the beam by a horizontal pivot, a trailing implement having a tilting frame mounted on a horizontal axis and affording a rear point of ground support, a stub tongue horizontally pivoted at its rear end to the frame of the trailing implement at a point in advance of the tilting center thereof, and horizontally pivotally connected at its front end with respect to the connecting element, and a compensating connection horizontally pivoted at its forward end to the horizontally pivoted connecting element, and horizontally pivoted at its rear end to the tilting frame at a point to the rear of the tilting center thereof, substantially as described.

5. In a combined implement of the class described, the combination of an unstable power unit affording a forward point of ground support, a beam rearwardly extending therefrom and pivoted thereto on a vertical pivot, a connecting element connected with the beam by a horizontal pivot, a trailing implement having a tilting frame affording a rear point of ground support, a stub tongue pivoted at its rear end to the frame of the trailing implement and pivotally connected at its forward end with respect to the connecting element, a walking beam connected at its forward end to the connecting element and connected at its rear end to the frame of the trailing implement, and a connection between an intermediate portion of the walking beam and the connecting element, substantially as described.

6. In a combined implement of the class described, the combination of an unstable power unit affording a forward point of ground support, a rearwardly extending beam pivoted at its forward end to the power unit on a vertical pivot, a trailing implement, a stub tongue connected by a horizontal pivot with the trailing implement, a horizontal pivotal connection for pivotally uniting the forward end of the stub tongue with respect to the rearwardly extending beam, a walking beam pivoted at its rear end to the frame of the trailing implement and connected at its forward end with the rearwardly extending beam, and a connection interposed between an intermediate portion of the walking beam and the rearwardly extending beam, substantially as described.

7. In a combined implement of the class described, the combination of an unstable power unit providing a forward point of ground support, a beam rearwardly extending from the power unit and connected therewith by a vertical pivot, a trailing implement affording a rear point of ground support and provided with a tilting frame, a stub tongue connected by a horizontal pivot with the forward end of the tilting frame, a walking beam having its rear end connected to the tilting frame at a point behind its center of tilting movement, and having its forward end connected with the rearwardly extending beam, and a connection interposed between an intermediate portion of the walking beam and the rearwardly extending beam, substantially as described.

8. In a combined implement of the class described, the combination of an unstable power unit providing a forward point of ground support, a beam rearwardly extending from the power unit and connected therewith by a vertical pivot, a trailing implement affording a rear point of ground support and provided with a tilting frame, a stub tongue connected by a horizontal pivot with the forward end of the tilting frame, a walking beam having its rear end connected to the tilting frame at a point behind its center of tilting movement, and having its forward end connected with the rearwardly extending beam, a connection interposed between an intermediate portion of the walking beam and the rearwardly extending beam, and means for adjusting the angle between the tilting frame and the stub tongue, substantially as described.

9. In a combined implement of the class described, the combination of an unstable power unit providing a forward point of ground support, a beam rearwardly extending from the power unit and connected therewith by a vertical pivot, a trailing implement affording a rear point of ground support and provided with a tilting frame, a stub tongue connected by a horizontal pivot with the forward end of the tilting frame, a walking beam having its rear end connected to the tilting frame at a point behind its center of tilting movement, and having its forward end connected with the rearwardly extending beam, a spring connection interposed between an intermediate portion of the walking beam and the rearwardly extending beam, and a draft connection between the power unit and the stub tongue, substantially as described.

10. In a combined implement of the class described, the combination of an unstable power unit affording a forward point of ground support, a beam rearwardly extending therefrom and connected therewith by a vertical pivot, an elongated connecting element pivoted to the beam by a horizontal pivot, a hanger depending from the connecting element, a trailing implement provided with a tilting frame and affording a rear point of ground support, a stub tongue pivoted at its rear end by a horizontal pivot to the frame of the trailing implement and pivoted at its forward end by a horizontal pivot to the hanger, a walking beam pivoted at its rear end to the trailing implement and connected at its forward end to the hanger, and a spring connection between an intermediate portion of the walking beam and the connecting element, substantially as described.

11. In a combined implement of the class described, the combination of an unstable power unit affording a forward point of ground support, a beam rearwardly extending therefrom and connected therewith by a vertical pivot, an elongated connecting element pivoted to the beam by a horizontal pivot, a hanger depending from the connecting element, a trailing implement provided with a tilting frame and affording a rear point of ground support, a stub tongue pivoted at its rear end by a horizontal pivot to the frame of the trailing implement and pivoted at its forward end by a horizontal pivot to the hanger, a walking beam pivoted at its rear end to the trailing implement and connected at its forward end to the hanger, a spring connection between an intermediate portion of the walking beam and the connecting element, and means on the trailing implement for adjusting the angular relation between the trailing implement and the stub tongue, substantially as described.

12. In a combined implement of the class described, the combination of an unstable power unit affording a forward point of ground support, a beam rearwardly extending therefrom and connected therewith by a vertical pivot, an elongated connecting element pivoted to the beam by a horizontal pivot, a hanger depending from the connecting element, a trailing implement provided with a tilting frame and affording a rear point of ground support, a stub tongue pivoted at its rear end by a horizontal pivot to the frame of the trailing implement and pivoted at its forward end by a horizontal pivot to the hanger, a walking beam pivoted at its rear end to the trailing implement and connected at its forward end to the hanger, a spring connection between an intermediate portion of the walking beam and the connecting element, and a guide bar upstanding from the stub tongue and slidably connected to the connecting element, substantially as described.

13. In a combined implement of the class described, the combination of an unstable power unit affording a forward point of ground support, a beam rearwardly extending therefrom and connected therewith by a vertical pivot, an elongated connecting element pivoted to the beam by a horizontal pivot, a hanger depending from the connecting element, a trailing implement provided with a tilting frame and affording a rear point of ground support, a stub tongue pivoted at its rear end by a horizontal pivot to the frame of the trailing implement and pivoted at its forward end by a horizontal pivot to the hanger, a walking beam connected at its rear end to the trailing implement and connected at its forward end to the hanger, a spring connection between an intermediate portion of the walking beam and the connecting element, and a low down draft connection between the stub tongue and the power unit, substantially as described.

14. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, and a spring connection interposed between the connecting element and the frame, substantially as described.

15. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, and a spring connection between the walking beam and the connecting element, substantially as described.

16. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, and means for adjusting the angle between the stub tongue and the tilting frame, substantially as described.

17. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, and guide bars upstanding from the stub tongue and slidably connected with the connecting element, substantially as described.

18. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, means for adjusting the angle between the stub tongue and the tilting frame, and guide bars upstanding from the stub tongue and slidably connected with the connecting element, substantially as described.

19. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, guide bars upstanding from the stub tongue and slidably connected with the connecting element, and a low down draft connection between the stub tongue and the power unit, substantially as described.

20. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, means for adjusting the angle between the stub tongue and the tilting frame, guide bars upstanding from the stub tongue and slidably connected with the connecting element, and a low down draft connection between the stub tongue and the power unit, substantially as described.

21. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, guide bars upstanding from the stub tongue and slidably connected with the connecting element, an extension supporting rod connected at its forward end to the rearwardly extending beam and slidably supported at its rear end, and a mechanism for steering and controlling the power unit within convenient reach of the point of control for the trailing implement and carried by the extension supporting rod, substantially as described.

22. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, means for adjusting the angle between the stub tongue and the tilting frame, guide bars upstanding from the stub tongue and slidably connected with the connecting element, an extension supporting rod connected at its forward end to the rearwardly extending beam and slidably supported at its rear end, and a mechanism for steering and controlling the power unit within convenient reach of the point of control for the trailing implement and carried by the extension supporting rod, substantially as described.

23. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, guide bars upstanding from the stub tongue and slidably connected with the connecting element, a low down draft connection between the stub tongue and the power unit, an extension supporting rod connected at its forward end to the rearwardly extending beam and slidably supported at its rear end, and a mechanism for steering and controlling the power unit within convenient reach of the point of control for the trailing implement and carried by the extension supporting rod, substantially as described.

24. In a combined implement of the class described, the combination of an unstable power unit, a beam rearwardly extending from the power unit and pivoted thereto on a vertical axis, hangers depending from the beam, a connecting element in the form of an elongated frame, longitudinal pivotal connections between the hangers and the elongated frame, a hanger depending from the connecting element, a trailing implement provided with a tilting frame and affording a rear point of ground support, a stub tongue pivoted at its rear end by means of a horizontal pivot to the forward portion of the tilting frame, a horizontal pivot connecting the forward end of the stub tongue with the last mentioned hanger, a walking beam connected at its rear end to the tilting frame and connected at its forward end to the last mentioned hanger, a spring connection between the walking beam and the connecting element, means for adjusting the angle between the stub tongue and the tilting frame, guide bars upstanding from the stub tongue and slidably connected with the connecting element, a low down draft connection between the stub tongue and the power unit, an extension supporting rod connected at its forward end to the rearwardly extending beam and slidably supported at its rear end, and a mechanism for steering and controlling the power unit within convenient reach of the point of control for the trailing implement and carried by the extension supporting rod, substantially as described.

HARRY S. DICKINSON.

Witnesses:
 L. C. BLANDING,
 JAMES J. LAMB.